Dec. 16, 1952 — L. HAAPALA — 2,621,460
DEVICE FOR SHREDDING AND DISINTEGRATING VEGETABLE STALKS
Filed Nov. 17, 1948 — 3 Sheets-Sheet 1

INVENTOR.
LEVI HAAPALA
BY
Attorney

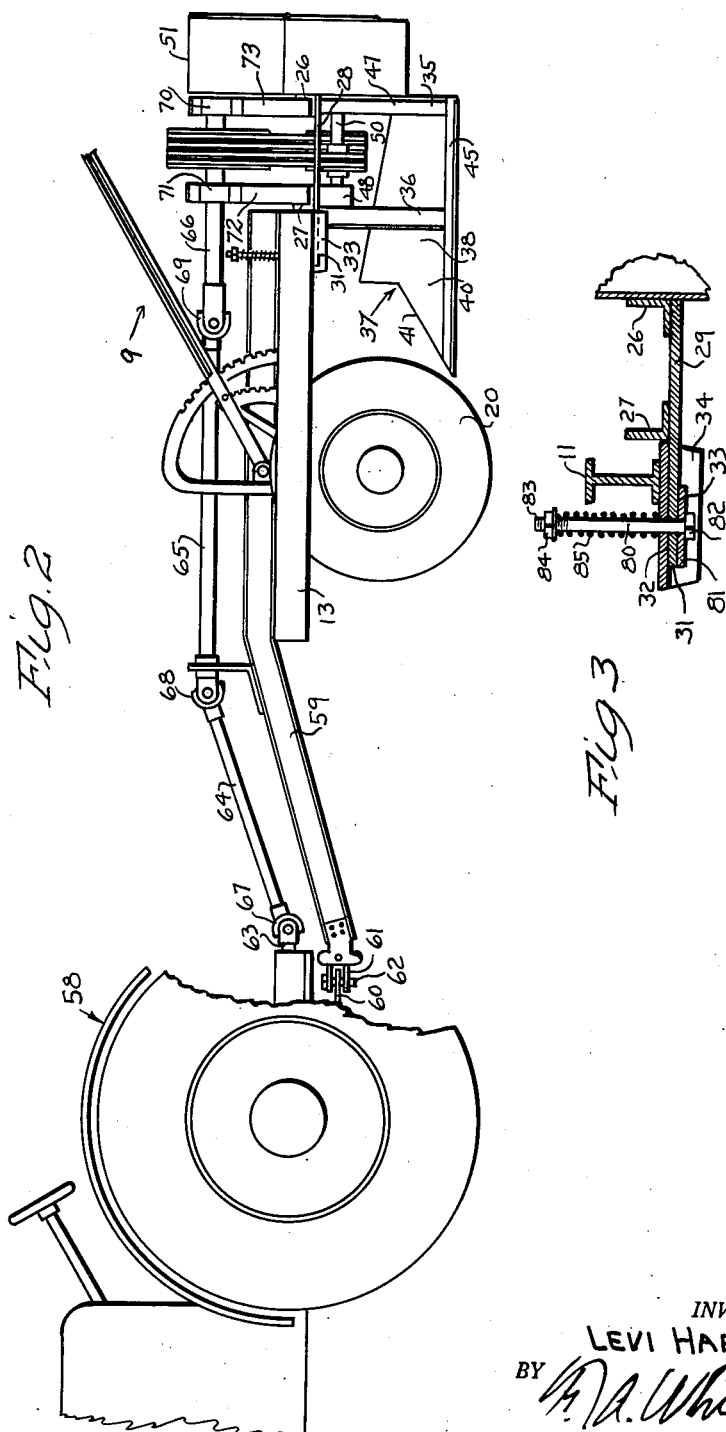

Dec. 16, 1952 L. HAAPALA 2,621,460
DEVICE FOR SHREDDING AND DISINTEGRATING VEGETABLE STALKS
Filed Nov. 17, 1948 3 Sheets-Sheet 3
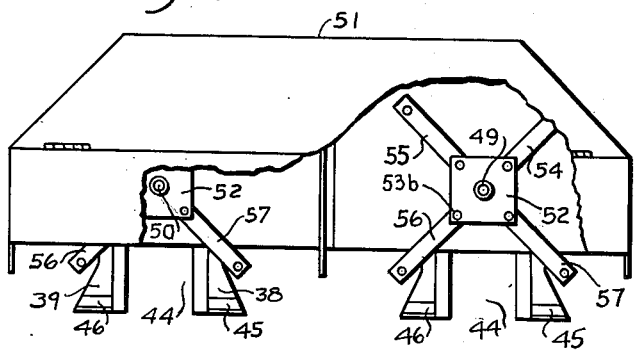
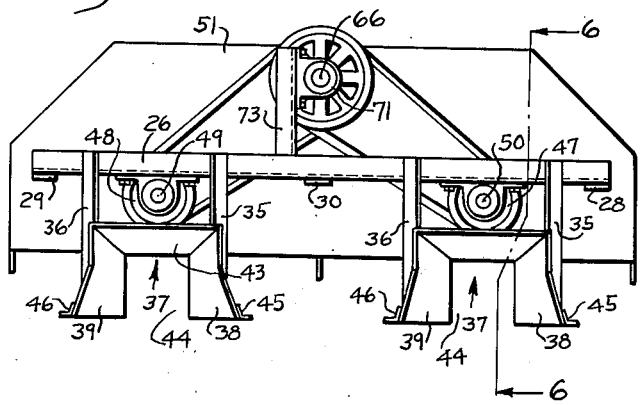
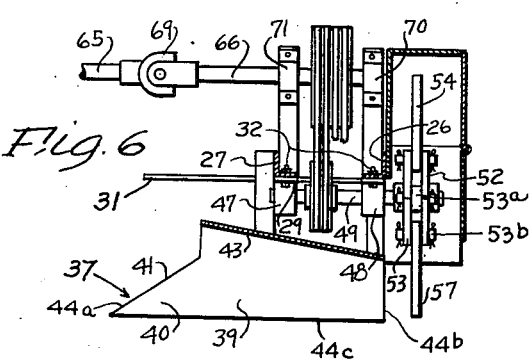
INVENTOR.
LEVI HAAPALA Patented Dec. 16, 1952

2,621,460

UNITED STATES PATENT OFFICE 2,621,460

DEVICE FOR SHREDDING AND DISINTEGRATING VEGETABLE STALKS

Levi Haapala, Dassel, Minn., assignor to Whiteley and Caine, Minneapolis, Minn., a partnership Application November 17, 1948, Serial No. 60,437

6 Claims. (Cl. 55—118)

My invention relates to a device for shredding and disintegrating vegetable stalks such as cornstalks, which have not been shocked or removed from the field, but are to be plowed under and conserve the soil by the humus of said cornstalks or other vegetable growth being integrated in the soil.

With the use of mechanical corn pickers, and to a degree with hand picking, the cornstalks are left on the field in the rows in which the corn has been grown. Other vegetation, such as bean vines, cotton plants, and the like are similarly left on the field. Such plant material, specifically the cornstalk plants, remain more or less intact after the crop has been harvested.

I have developed a relatively simple and effective machine for gathering and disintegrating the stalks after the useful crop has been harvested, so that the stalks will not remain as a breeding area for pests, such as the corn borer or boll weevil, and will also enable the stalks when disintegrated to be readily plowed into the soil to add organic matter.

This device in its entirety comprises a wheeled frame, with draw-bar attachment to a tractor and power shafting running from the power take-off of the tractor back over the wheeled frame, together with funnel-like members supported below the frame and acting to bring the cornstalks or other vegetable matter into substantially horizontal alignment over the corn rows. The power means operates on two or more shafts, for rapid rotation thereof, and on the ends of the shafts is a head member to which are freely pivoted a multiplicity of beater bars, which during rotation are held substantially diametrically outward through centrifugal force and which rotate transversely of the plant rows and at the rear of the funnel device, and beat across the length-wise extending cornstalks or other vegetable matter. These flail-like clips or beater bars strike every cornstalk hundreds of times and shred and disintegrate them clear back into the root stalks.

Where my invention is employed, as is most highly practical, as an attachment to the frame of a tractor drawn plow, the tooth-like plow members are removed from the plow frame, which may readily be done, and means connected with my invention will be placed in some of the sockets of the tooth-like plow members and the device will be used as an attachment to that frame.

It is a principal object of my invention to provide in conjunction with a tractor drawn frame, a device at the rear of said frame which embodies rotatable heads having thereon a multiplicity of pivoted hammer clips or beater bars operating at right angles to the direction of movement of the frame and of the plant rows, and which will beat across the plant rows and strike plant stalks or other plant growth transversely of their lengths, thus shredding and disintegrating said stalks.

Another object of the invention is to provide in combination with a sturdy mobile frame member, having means for elevating the frame with respect to the ground, a tractor normally connected at its rear to the frame and having a power driven shaft extending rearwardly over the frame, together with a stalk disintegrating device adapted for removable attachment to the rear of the frame and the drive shaft, and containing one or more stalk gathering tunnels positioned to pass over and collect row-growing stalks such as cornstalks and the like, together with a plurality of pivotally supported beater bars supported in rear of the tunnels which are rapidly rotated in rear of the tunnels and at right angles to the direction of movement of the tunnels for disintegrating the stalks collected by the tunnels.

A further object is to provide in a stalk disintegrating device embodying a mobile stalk gathering tunnel adapted to collect the stalks of row grown crops and a driven shaft above the tunnel and projecting beyond the rear of the tunnel, stalk disintegrating means consisting of a plurality of rectangular beater bars which are loosely pivoted about the driven shaft to produce a flailing action across the rear end of the tunnel and across the rows of stalks to strike the stalks transversely of their length to shred and disintegrate the stalks.

The full objects and advantages of my invention will appear in connection with the detailed description thereof hereinafter given in the following specification, and the novel features of my invention by which the aforesaid important and advantageous results are obtained will be particularly pointed out in the claims.

In the drawings illustrating an application of my invention in one of its forms.

Fig. 2 is a side elevation view of substantially what is shown in Fig. 1.

Fig. 3 is a sectional view on an enlarged scale taken on line 3—3 of Fig. 1.

Fig. 4 is an end elevation view of the apparatus viewed from the rear apart from the frame upon which it is mounted with portions broken away to show interior structure.

Fig. 5 is a similar view of my apparatus viewed from the front.

Fig. 6 is a sectional view on enlarged scale of my apparatus taken on line 6—6 of Fig. 5.

Figure 1:
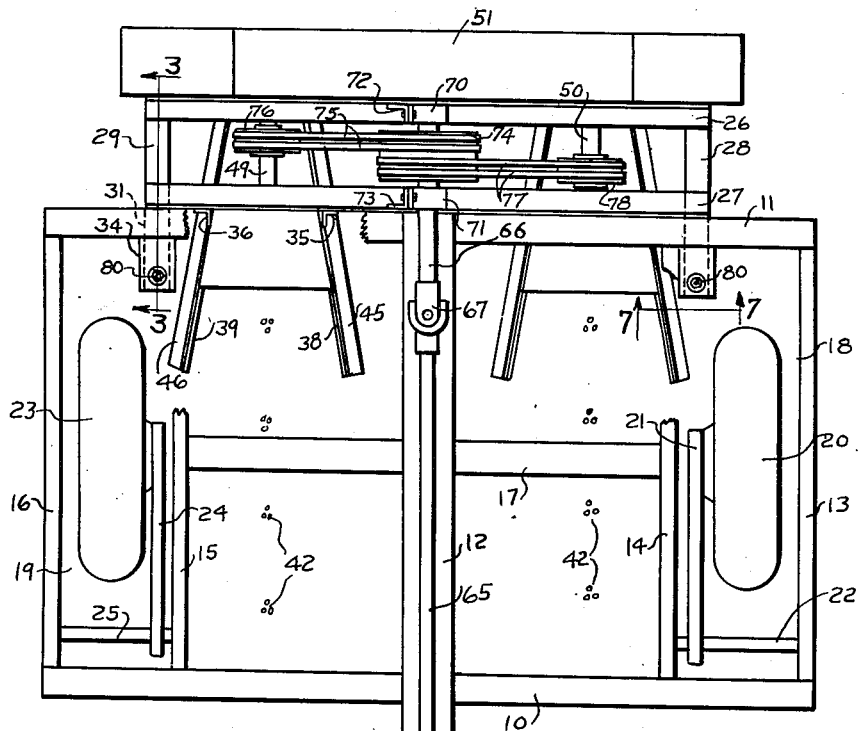
Fig. 1 is a plan view of the invention as applied to a tractor drawn frame.

My invention is illustrated as detachably connected with a regular plow frame. Obviously the invention can be applied to a frame of its own, which is provided with a draft bar connection to a tractor, and the description and claims herein given will apply to such a special frame construction equally as to the frame of a plow.

As shown the plow frame comprises a front transverse bar 10, a rear transverse bar 11, a center longitudinal draft bar 12, and two pairs of longitudinally extended side bars. These side bars are designated respectively 13 and 14 for the bars at the right of Fig. 1 in the drawings, and 15 and 16 for the bars at the left of Fig. 1. A central transverse bar 17 is secured to the inner longitudinal bars 14 and 15 and to the center part 12.

There is therefore a free space 18 between the bars 13 and 14 and a free space 19 between the bars 15 and 16.

Within the space 18 a supporting wheel 20 is mounted on the end of a strong arm 21, which in turn is pivoted to a round cross arm 22 extending between frame pieces 13 and 14. Similarly within space 19 a supporting wheel 23 is mounted on the end of an arm 24 which is pivotally carried on a round supporting member 25.

A lever system, shown generally at 9 in Fig. 2, is adapted simultaneously to rock the arms 21 and 24, and by that means to lift or lower the frame above described either for plowing purposes at whatever depth is selected, or for transportation when the machine is not in operation. Such an arrangement is present in the second form of tractor drawn plow and may be effectively employed on a frame built solely for supporting my invention.

As clearly shown, my device for stalk shredding or disintegrating, whether as an attachment to an existing plow frame, or in conjunction with an individual frame support for the device only, comprises two transverse angle-iron members 26 and 27 extending in parallel relation, and welded or otherwise secured at their ends to longitudinal frame members 28 and 29, with an intervening bar member 30, Fig. 5, of similar shape.

As here shown, the bar members 28, 29 and 30 are each provided with extended portions 31, Figs. 3 and 6, also indicated in dotted lines on Fig. 1. As shown in Figs. 2 and 6, these bar members are bolted at 32 to the lower flanges of the transverse angle-irons 26 and 27, and the whole structure made up of transverse angle-irons 26 and 27 and bar members 28, 29 and 30 forms a rigid supporting frame structure for all of the elements of my invention.

In the form of my invention here shown, the extensions 31 of the bar members 28, 29 and 30 enter sockets or guide-ways 33 formed in channel irons 34 which themselves are bolted or otherwise secured to the transverse frame member 11, as clearly shown in Fig. 3.

Figure 7:
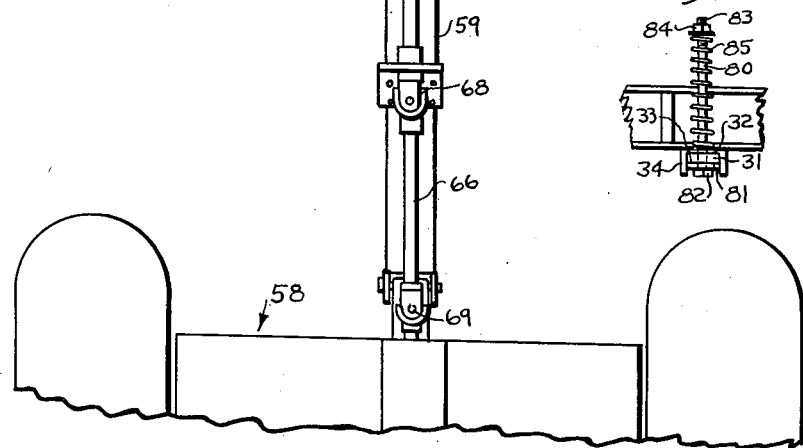
Fig. 7 is a sectional fragmentary view taken on line 7—7 of Fig. 1.

In the removable connection, particularly shown in Figs. 1, 3 and 7, a bolt 80 with a head 81, secured to the bolt 80 by welding or casting, or by a normal bolt head 82, has on its threaded outer end 83 a nut 84, and between the nut 84 and the top wall of the channel iron 34 is located a compression spring 85, which normally exerts compressive force along the bolt 80, to force the upper part of the extension portion 31 firmly against the wall of the channel-way 33.

To make the connection between the extensions 28, 29 and 30 and the frame formed of the members 10, 11, 12, 13, 14, 15 and 16, it is only necessary to take off the nut 84 from the threaded bolt end 83, withdraw the bolt and then after the extension 31 has been introduced into the socket 33 to pass the bolt through an opening in said extension and through the spring 85 and restore the nut 84 to the threaded end of bolt 83.

As much compression can be placed on the spring as is desired. This arrangement firmly secures the part comprising my cornstalk shredding and disintegrating machine to whatever form is employed, and yet permits through the operation of spring 85 a certain amount of up and down movement of the parts connected thereby.

As shown in Figs. 1, 2 and 5, secured to transverse frame member 27 are two sets of vertical angle-iron supports 35 and 36. Each pair of the supports 35 and 36 holds in position a stalk-gathering tunnel indicated generally at 37, in Figure 5.

This member comprises side plates 38 and 39 of a shape shown in Figs. 2 and 6, of which each side plate 38 or 39 is provided with a forwardly extending tongue 40 formed with an upwardly slanting top edge 41, which edge is adapted to be thrust under any bent stalks so as to lift the cornstalks and bring them into parallel relation over the top of the corn rows, designated as 42 in Fig. 1. The plates 38 and 39 slant toward each other and are secured together at their tops by a downwardly and rearwardly sloping top plate 43, as clearly shown in Figs. 5 and 6.

There is thus formed a longitudinal channel with converging side and top walls and open at the front 44a, rear 44b and bottom 44c, which gathers the cornstalks or other plant stems together and relays them on the top of the plant row 42. The contracting rear opening of this plant-gathering member is well shown at 44 in Fig. 5.

For reinforcing the bottom of this plant gatherer 37 I provide angle-irons 45 and 46, which not only reinforce the lower edges of the side plates 38 and 39, but form the connection to the vertical supporting angle-irons 35 and 36.

Mounted in pairs of hanger brackets 47 and 48 are short shafts 49 and 50 which are positioned in alignment and directly above the corn rows or other plant rows 42, as clearly indicated in Fig. 1, there being a pair of said frames 47 and 48 on each of the shafts 49 and 50.

The several beater bars 54, 55, 56 and 57 which are shown in Figs. 4 and 6, are rectangular in outline and are made of extremely tough steel. The several bars are pivotally connected adjacent their inner ends between the plates 52, 53 to permit individual pivotal movement of each of the bars. The plates 52, 53 are separated by a collar 53a, and the pivots 53b consist of heavy bolts or the like. Since the rotating movement of these bars produces the force necessary to disintegrate the stalks it is desirable that they be as long and as heavy as possible. The length and mass of the bars will to a certain degree be controlled by other structures making up the machine. The power requirements, as well as the centrifugal force developed by the rapidly rotating bars, are factors which must be taken into consideration. I have found that the best results are obtained when the distance between the point of pivoting and the outer end of the bar is more than twice the distance between the axis of the driven shaft and the point of pivoting. The pivoted connection between each bar and the plates 52, 53 is essential not only for the development of centrifugal force, but also to permit the bar to move on its pivot in the event that the outer end of the bar hits an obstruction or has its movement impeded by tough stalks. The pivotal movement prevents the bar from being broken on contact with a stone, and it has the added advantage of providing a degree of flexibility to the movement of the bars.

The head, made up of plates 52 and 53, is rotated by shafts 49 and 50 at quite high speed, the preferred speed being from 1500 R. P. M. to 1700 R. P. M. The members 54, 55, 56 and 57 may be called clips or shredder bars. As the shafts 49 and 50 are rotated at the above high speed centrifugal force will throw the bars 54, 55, 56 and 57 radially outwardly. These bars moving with high velocity and consequent high impact force will contact the plant stems, specifically cornstalks, and cut, beat, tear and shred them into a state of substantial disintegration. In doing this it will open up the corn borer larvae nests and either destroy the larvae by direct contact or so expose it that it will die.

The power for rotating the shafts 49 and 50 is taken from the tractor, indicated generally at 58, specifically from the power take-off of the tractor motor.

As shown in Figs. 1 and 2, a drawbar 59 connects with the tractor drawbar 60 by means of a clevis arrangement 61 and a clevis bolt 62, which bolt extends vertically through the clevis bars 60 and 61.

The power take-off 63 is present in practically all tractors. From the power take-off of the tractor a series of shafts 64, 65 and 66 are connected together by universal joints 67, 68 and 69. The shaft 66 is journaled in bracket arms 70 and 71 which are mounted on the sides of upstanding angle iron supporting legs 72 and 73, which are rigidly connected by welding or in some other satisfactory manner with the transverse frame supports 26 and 27, as best shown in Fig. 1.

Upon the shaft 66 between the brackets 70 and 71 is mounted a V-groove pulley 74. This pulley has four grooves. A double V-belt 75 goes from the rear pair of said grooves to a double V-pulley 76 mounted on the drive shaft 49 which carries one of the clip heads 52, 53.

A second pair of V-belts 77 goes from the second or forward pair of V-grooves on pulley 74 to a double V-groove pulley 78 fast on the shaft 50 which carries the second clip head 52, 53.

In operation the main frame may be of special construction adapted to normally hold a plurality of removable plowshares and as such the main frame is normally connected to the rear of the tractor 58 by means of the connection 59, 60 and 61 for normal plowing operations. The device forming the present invention, namely the stalk disintegrating structure, is adapted to be removably connected to the rear end of the main frame to be carried by the main frame and replace the plowshares. The stalk disintegrating device is also operably connected to the power-take-off shaft 63 by means of the several coupling members 64, 65 and 66. The actual connection of the stalk disintegrating device to the main frame is accomplished by securing the forward extension 31 of the several bars 28, 29 and 30 into the sockets 33 on the rear end of the main frame and securing them in place by the bolts 80, as clearly illustrated in Figs. 3 and 7. Thus it should be understood that while the main frame will have utility for other agricultural purposes such as the plowing of ground, the stalk disintegrating mechanism constitutes a removable attachment which is secured on the rear of the frame to replace the plowshares and thus gain a double usage from the plow frame. When the main frame is being propelled by the tractor 58 and the several power shafts 63 and 66 have been connected so as to drive the pulleys 74, 76 and 78 by means of the belts 75 and 77, the head members composed of the plates 52, 53, will be driven transversely to the rear ends of the stalk gathering tunnels. Each of the beater bars 54, 55, 56 and 57 is pivotally secured between the plates 52, 53 at the corners of the plates and in such a manner that they produce a very powerful centrifugal action which is greater than the power normally obtained if these bars were rigidly secured between the plates or only had a limited degree of pivotal movement relative to the head members. As the stalk gathering tunnels are moved over rows of cornstalks, or other vegetable stalks indicated by the reference characters 42, the stalks are collected within the tunnels and bent into a horizontal position. The forward sloping edges 41 of the tunnels will tend to gather any bent stalks and move them into alignment with the rows of stalks. As the tunnels pass over the stalks, the rapidly revolving beater bars which are of a length so as to extend to substantially the lower edges of the tunnels 37 will beat against the stalks as they emerge from the rear end of the tunnels, and aided by the sides of the tunnels perform a shearing action on the stalks, and a disintegration of the rootstalks, to thereby cut the stalks into small pieces so as to expose the larvae of insects which may be embedded therein. As the rootstalks form the best breeding areas for the larvae, it is of particular importance that these portions of the stalks be thoroughly disintegrated. Since the rootstalks are very close to the ground level and may be partially surrounded by clods of earth, the loose flailing action of the relatively heavy blunt ended bars literally tears apart these portions of the stalks since the ends of the bars can be adjusted to graze the ground surface. As the stalks are embedded in the ground and are merely aligned by the tunnels, the bars will initially engage the root portions of the plants while the remainder of the stalk, along with other stalks are held within the tunnels. Thus the blunt ends of the bars tend to dig up the root portions while the lateral edges of the bars cooperate with the walls of the tunnels to shear the remainder of the stalks as they emerge from the ends of the tunnels. In many areas of the country and in fact in most agricultural land a certain amount of small rocks or stones will be present on the surface of the soil. The hammers or bars will either drive these stones to one side or break them, or in the instance of larger stones, the loose pivotal mounting of the bars will avoid their destruction, since they are capable of rotating on their pivots if they hit an immovable object. Thus it should be understood that the bars must move transversely across the rear ends of the tunnels and close enough to the tunnels to shear the stalk, they must be long enough to reach the rootstalks at the ground level, they must be made of material which is hard enough to resist contact with rocks and stones, and they must be pivotally supported at their inner ends so as to develop centrifugal action and to have pivotal movement when they hit hard objects.

The advantages of my invention will be apparent from the foregoing description. The main advantage of my invention consists in bringing the stalks of any plants into substantial parallelism with the direction of movement of the machine and brought down toward the ground level over which the machine is being pushed, in conjunction with freely pivoted hammer clips rotated at high speed and at right angles to the direction of the movement of the machine and across the lengthwise extent of the stalks, whereby the stalks will be struck many times throughout their length violent blows, which will at the same time shred and disintegrate the stalks into more or less small particles and break up corn borer nests, and either directly destroy the corn borers by striking and crushing them, or by exposing them to weather which will cause them to die.

I claim:

1. In an agricultural device, in combination, an implement supporting frame, a pair of wheels secured to the opposite lateral sides of said frame and supporting said frame for movement relative to the ground, a tractor connected at its rear to said frame, a power-take-off shaft extending from the tractor beyond the rear end of the frame, and a stalk disintegrating device comprising a second frame, a stalk gathering tunnel depending from said second frame for movement over a row of vegetable stalks, a driven shaft supported by said second frame and extending longitudinally over said tunnel, one end of said shaft extending beyond the rear end of the tunnel, means connecting said shaft and the power-take-off shaft, a plurality of loosely pivoted beater bars supported on said driven shaft in rear of the tunnel for rotation in a plane transverse to the tunnel for disintegrating stalks collected by the tunnel, a plurality of forwardly extending bars carried by the second frame, and means for detachably securing said bars to the first named frame in such a manner that the second frame is releasably carried on the rear of the first named frame.

2. In an agricultural device, in combination, a plow frame, a pair of ground engaging wheels, elevating means connecting the plow frame and the wheels for elevating the plow frame relative to the ground, a plurality of sockets carried by said plow frame, a tractor connected at its rear to said frame, a power-take-off shaft extending from the tractor beyond the rear end of the frame, and a stalk disintegrating device comprising a second frame, a stalk gathering tunnel depending from the second frame and extending longitudinally under a portion of the first named frame for movement over a row of vegetable stalks, a driven shaft supported by said second frame and extending longitudinally over the tunnel with one end extending beyond the rear end of the tunnel, means operably connecting the power-take-off shaft and the driven shaft, a pair of spaced plates carried by the driven shaft in rear of the tunnel, a plurality of beater bars loosely pivoted between said plates for rotation in a plane transverse to the tunnel for disintegrating stalks collected by the tunnel, a plurality of forwardly extending bars carried by the second frame and adapted to slidably fit within the sockets on the first named frame, and means for detachably securing said bars within said sockets in such a manner that the second frame is releasably carried on the rear of the first named frame.

3. In an agricultural device, in combination, a plow frame, composed of front and rear transverse members, a plurality of longitudinally extending members joining the front and rear members, a pair of ground engaging wheels operably connected to the frame and supporting said frame for movement relative to the ground, a plurality of rearwardly extending sockets carried by one of the transverse members, a tractor connected at its rear to said frame, a power-take-off shaft extending from the tractor beyond the rear end of the frame, and a stalk disintegrating device comprising a second frame, a pair of laterally spaced longitudinally extending stalk gathering tunnels depending from said second frame and extending under a portion of the first named frame for movement over adjacent rows of vegetable stalks, a pair of laterally spaced driven shafts supported by said second frame each extending longitudinally over one of said tunnels and each having one end extending beyond the rear end of said tunnels, means operably connecting each of said shafts and the power-take-off shaft, a pair of spaced plates carried by each of said driven shafts in rear of the respective tunnels, a plurality of beater bars loosely pivoted between each pair of plates for rotation in rear of each of the tunnels and in a plane transverse to the tunnels for disintegrating stalks collected by the tunnels, a plurality of forwardly extending bars carried by the second frame and adapted to slidably fit within the sockets on the rear transverse member of the first named frame, and means for detachably securing said bars within said sockets in such a manner that the second frame is releasably carried on the rear of the first named frame.

4. In a machine for disintegrating vegetable stalks embodying a stalk-gathering tunnel having open front and rear ends and adapted to pass over a row of vegetable stalks, a rotatably driven shaft supported above the tunnel and projecting beyond the rear end of the tunnel, the improvement consisting of a pair of laterally spaced members carried on the shaft in rear of the tunnel for rotation in a plane transverse to the tunnel, a plurality of pivots extending between said spaced members adjacent their peripheries and at a maximum permissible distance from the axis of the shaft, and a linear beater bar which is rectangular in outline rotatably mounted on each of said pivots and in sliding contact with the inner sides of said spaced members, said bars extending outwardly from their centers of pivoting a distance of substantially two and one-half times the distance between the points of pivoting and the axis of the shaft so that when rotated their outer ends will be moved substantially in contact with the level of the ground to engage and disintegrate the root portions of the stalks.

5. In a stalk disintegrating machine embodying a mobile tunnel having open front and rear ends and adapted to pass over and collect row growing stalks, a driven shaft supported above the tunnel and projecting horizontally in rear of the tunnel, a supporting member secured to the shaft in rear of the tunnel for rotation in a plane transverse to the axis of the shaft, the improvement consisting of a plurality of beater bars carried in a single plane by the supporting member and projecting radially from the supporting member for rotation close to the rear end of the tunnel to effect disintegration of stalks gathered by the tunnel, and connecting means pivotally joining each bar to the supporting member to form a single row of bars about the supporting member and being operative to permit individual pivotal movement of each bar when its rotative movement is impeded.

6. In a device for disintegrating vegetable stalks embodying a stalk-gathering and positioning tunnel formed with an open bottom and open front and rear ends, the rear end opening being of comparatively small area, a driven shaft supported to extend longitudinally above the top of the tunnel and projecting longitudinally to a point just beyond the rear end of the tunnel, a supporting member of substantial area relative to the area of the rear opening of the tunnel held on and at right angles to said rear end of said shaft, the improvement consisting of a plurality of beater bars loosely pivoted at their inner ends to the most outwardly extended portions of said supporting member and swinging freely therefrom for rotation in a plane close to and transverse to the rear edges of the tunnel, said beater bars being of substantial mass and having relatively blunt beating edges which cooperate with the rear edges of the tunnel in the plane of the rear opening to effect a beating disintegration of the stalks as the tunnel is moved along a row of stalks.

LEVI HAAPALA.

REFERENCES CITED

The following references are of record in the file of this patent:

UNITED STATES PATENTS

| Number | Name | Date |
|---|---|---|
| 657,411 | Hamm | Sept. 4, 1900 |
| 1,698,724 | Johnston et al. | Jan. 15, 1929 |
| 2,479,510 | Pollard et al. | Aug. 16, 1949 |